(12) United States Patent
Haslett et al.

(10) Patent No.: US 6,886,995 B2
(45) Date of Patent: May 3, 2005

(54) BACK REFLECTION INSENSITIVE ELECTRO-OPTICAL INTERFACE AND A METHOD OF COUPLING THE SAME TO A WAVEGUIDE

(75) Inventors: Tom Haslett, Toronto (CA); Wei Li, Waterloo (CA); Seyed Mostafa Sadeghi, Toronto (CA); Ali M. Shams-Zadeh-Amiri, North York (CA)

(73) Assignee: Photonami, Inc. (CA)

( * ) Notice: Subject to any disclaimer, the term of this patent is extended or adjusted under 35 U.S.C. 154(b) by 67 days.

(21) Appl. No.: 10/269,892

(22) Filed: Oct. 11, 2002

(65) Prior Publication Data

US 2004/0001675 A1 Jan. 1, 2004

(30) Foreign Application Priority Data

Jun. 28, 2002 (CA) .............................................. 2392119

(51) Int. Cl.[7] .................................. G02B 6/36
(52) U.S. Cl. ......................... 385/88; 385/89; 385/92; 385/94; 372/96; 372/45; 372/50; 372/102
(58) Field of Search ........................ 385/88, 89, 92, 385/94; 372/96, 45, 50, 102

(56) References Cited

U.S. PATENT DOCUMENTS

| | | | |
|---|---|---|---|
| 4,807,955 A | * | 2/1989 | Ashman et al. ............... 385/88 |
| 5,452,318 A | | 9/1995 | Makino et al. |
| 5,717,804 A | * | 2/1998 | Pan et al. ...................... 385/94 |
| 5,727,013 A | | 3/1998 | Botez et al. |
| 5,760,946 A | | 6/1998 | Yokoi et al. |
| 5,970,081 A | | 10/1999 | Hirayama et al. |
| 6,081,636 A | | 6/2000 | Kinoshita |
| 6,117,699 A | | 9/2000 | Lemoff et al. |
| 6,244,754 B1 | * | 6/2001 | Takagi et al. ................. 385/88 |
| 6,330,268 B1 | | 12/2001 | Huang |

FOREIGN PATENT DOCUMENTS

| | | |
|---|---|---|
| JP | 11 307856 | 11/1999 |
| JP | 2000 077774 | 3/2000 |
| WO | WO 01/13480 A1 | 2/2001 |
| WO | WO 01/93385 A2 | 12/2001 |

OTHER PUBLICATIONS

Carlson, N.W., et al., "Mode Discrimination in Distributed Feedback Grating Surface Emitting Lasers Containing a Burled Second–Order Grating," IEEE Journal of Quantum Electronics, IEEE Inc., New York, US, vol. 276, No. 6, Jun. 1, 1991, pp. 1746–1752.

(Continued)

Primary Examiner—Anthony Dinkins
Assistant Examiner—Anton Harris
(74) Attorney, Agent, or Firm—Hoffmann & Baron, LLP

(57) ABSTRACT

An electro-optical interface with a package base having an electrical connection configuration suitable for connecting to a source of electrical signals. A semiconductor optical signal source is provided mounted to the base and having a second or higher order grating in the cavity. The signal source is operatively connected to the package base whereby the electronic signals may be converted into optical signals. A waveguide is positioned adjacent to the signal source to couple the optical signal to the waveguide. The cavity is sized, shaped and positioned so that a radiation field for the cavity is not a mode discrimination mechanism wherein any back reflections into the cavity will affect a coupling coefficient to the radiation field without significantly adversely affecting the output signal quality.

22 Claims, 8 Drawing Sheets

OTHER PUBLICATIONS

Lopez, J., et al., "Surface–Emitting Distributed–Feedback Diode Lasers with Uniform Near–Field Intensity Profile", Applied Physics Letters, American Institute of Physics, New York, US, vol. 73, No. 16, Oct. 19, 1998, pp. 2266–2268.

Masoud Kasralan et al., "Single–Lobed Far–Field Radiation Pattern From Surface–Emitting Complex–Coupled Distributed–Feedback Diode Lasers", Applied Physics Letters, American Institute of Physics, New York, US, vol. 67, No. 19, Nov. 6, 1995, pp. 1783–2785.

Lopez, J.G., et al., "Uniform Near–Field Symmetric–mode Surface Emission from Complex–Coupled $2^{nd}$–Order Distributed–Feedback Lasers", Lasers and Electro–Optics Society Annual Meeting, 1997, Leos '97 $10^{th}$ Annual Meeting, Conference Proceedings, IEEE San Francisco, CA, USA, Nov. 10–13, 1997, New York, NY US, IEEE, US, Nov. 10, 1997, pp. 9–10.

Kazarinov, R.F. and Henry, C.H., "Second–Order Distributed Feedback Lasers with Mode Selection Provided by First–Order Radiation Losses", Journal of Quantum Electronics, vol. 73, No. 16, Feb. 2, 1985, pp. 144–150.

* cited by examiner

BACK REFLECTION INSENSITIVE ELECTRO-OPTICAL INTERFACE AND A METHOD OF COUPLING THE SAME TO A WAVEGUIDE

"The application claims priority from application Ser. No. 2,392,119 filed on Jun. 28, 2002.

FIELD OF THE INVENTION

This invention relates generally to the field of telecommunications and more particularly to optical signal-based telecommunications. Most particularly this invention relates to electro-optical assemblies for connecting semiconductor laser optical signal sources to optical signal transmitting waveguides such as optical fibres and the like.

BACKGROUND OF THE INVENTION

There are a variety of optical signal sources used for creating carrier signals for optical signal-based telecommunication systems. One type of signal source is a semiconductor laser that has certain advantages in being easy to manufacture in large quantities at a reasonable cost. There are many different types of such semiconductor laser signal sources including edge emitting semiconductor lasers, vertical cavity surface emitting lasers and more recently horizontal cavity surface emitting lasers.

Low-cost signal sources are urgently required to extend the optical-based networks from the present long haul backbone ring portions to local nodes closer to the end user, the latter being the so-called 'metro' portion of the network. While large and expensive signal sources are justifiable in the long haul backbone portions, the same cannot be said for all of the internal network nodes in a metro area. Infilling the network, bringing the optical signals closer and closer to the end user, is conditional upon being able to provide low cost high quality signal sources in large volumes to provide the vast number of required carrier signal sources for the metro portion of the network. To date there have been efforts to provide such signal sources, but the prior art signal sources suffer from numerous disadvantages and thus have not been deployed in a widespread fashion.

No matter what form the optical signal emitter takes there is a need to couple the signal light output to an optical waveguide, such as an optical fibre. Much effort has been devoted to designing the signal source or emitter to yield an output signal of sufficient power and signal quality that it can be efficiently and effectively coupled to the fibre or the like. Thus, the art teaches various designs of semiconductor which are claimed to produce a Gaussian shaped far field signal which can be easily and efficiently coupled to a fibre.

An electro-optical interface can be considered to be a point in a telecommunications network where the electrical signals are converted into optical signals in one direction and optical signals are converted to electrical signals in the other direction. A major concern in developing an appropriate signal source for the metro network portion of an optical network is the cost of the signal source. This is because there is a need for a separate signal source for each optical channel of the telecommunications band and separate signal sources at each electro-optical interface in the network. A low cost design is therefore required if the general deployment of such optical signal sources is to occur. The cost of the signal source can be divided into two main components. The first is the actual capital cost of the optical signal source. The second is the packaging cost of packaging the signal source together with whatever other components may be required to couple the signal source to a waveguide such as a fibre or the like.

Optical feedback is a known phenomenon, which can have a dramatic effect on the performance of laser signal sources. This property can be used to improve the optical signal output, through a so-called external cavity configuration. For example, if the longitudinal mode selection of the laser is made by other means, such as a grating reflector, the external feedback may be used for tuning the laser emission frequency or for a considerable line width narrowing. An external cavity having controlled external reflection or feedback may also be useful for reducing the signal chirp. Thus, prior art designs have made use of controlled feedback to improve signal characteristics in some cases. Usually such feedback, while leading to lower chirp and narrower lines, will also result in a lower bandwidth making the laser more difficult to modulate at high rates.

While controlled optical feedback may be useful as noted above, uncontrolled optical feedback can have the opposite effect. Uncontrolled optical feedback, also referred to as back reflection, can arise from any interface or scattering center in an optical network. Common sources of detrimental feedback include simple interfaces or partially reflective surfaces associated with a fibre pigtail connection in an optical network. Back reflection can travel along an optical path or waveguide and need not originate in the immediate environs of the signal source. When back reflected signal light couples back into the laser cavity, changes in the resonance condition arise causing often significant changes to the laser output. A back reflection into a laser cavity can also be considered as setting up a second cavity having many more modes than the original. Detrimental effects to signal quality include instabilities in the output signal power, mode hopping, wavelength shifts, increased noise and increased spectral line width of up to several tens of Gigahertz. These instabilities are also referred to as "coherence collapse" and arise when the back reflection enters into the laser cavity and detrimentally affects the lasing phenomenon.

To avoid the uncontrolled effects of back reflection, an optical isolator is required in all but the least demanding of applications. An optical isolator is defined as an element that allows light to pass in one direction only and is typically deployed to allow the outgoing signal light to pass while preventing back reflections from passing and entering into the cavity thus disturbing the laser stability. Isolators are normally placed between the signal source and the optical fiber or waveguide. Typically a lens is placed prior to the isolator to collimate the light output from the optical signal source through the isolator and a second lens is used to couple the light into the optical fiber or waveguide. The isolator must be placed and configured in a way to prevent detrimental back reflections from entering into the laser cavity, since such back reflections can cause the unwanted changes to the cavity characteristics and the loss of signal quality noted above.

The need for an optical isolator as explained has several undesirable consequences. Firstly, the further the signal source is away from the end of the fibre with which it is to be optically coupled, the more difficult and precise the alignments of the intervening components need to be. The more difficult the alignment, the more difficult the packaging becomes, thus lowering the manufacturing yields and increasing the packaging expense. The complexity of alignment increases nonlinearly with the number of elements required as the alignment errors in each element are cumulative for the overall alignment. Lastly of course there is the actual cost of the additional components, such as the isolator and any required lensing that is in many cases even more costly than the signal source.

FIG. 1 shows a typical Coarse Wavelength Division Multiplexed (CWDM) optical signal source 10, in the form of a laser semiconductor chip coupled to a fiber waveguide 12 according to the prior art. The laser chip 10 is of the edge emitting type and is mounted behind a lens 14, followed by an isolator 16. A back facet detector 18 is also shown, for monitoring the power of the output signal (since the signal is emitted from both edges of the chip). It will be seen that the fibre 12 is mounted to receive the focussed and isolated output or carrier signal from the chip 10. It will also be noted that stands 20 and 22 need to be positioned relative to chip 10 to couple the signal to the fibre 12. Electrical connectors 24 are also shown.

FIG. 2 shows a typical Dense Wavelength Division Multiplexed (DWDM) edge emitting signal source 30 coupled to a fibre waveguide 32 also according to the prior art. The general configuration is similar to that shown in FIG. 1, with additional components to ensure very stable signal output wavelengths. Thus, a thermoelectric cooler (TEC) 34 is provided for accurately controlling the temperature of the signal source. A back facet detector 36 is provided as well as a lens and isolator assembly 38. In this case two ball lenses 42, 44 are used to couple the output signal into the fibre 46. As can be appreciated the arrangement of these components which are already very small and which are likely to become even smaller in the future, represents a significant packaging challenge and expense.

What is needed is an optical semiconductor signal source packaging configuration which on the one hand reduces alignment concerns and hence packaging costs, and yet on the other hand produces a stable output suitable for use as a signal carrier wave in optical networks.

SUMMARY OF THE INVENTION

The present invention is directed to a novel packaging arrangement for coupling semiconductor signal sources to optical waveguides such as optical fibre. The present invention comprehends in one aspect a packaging arrangement that reduces alignment issues, by essentially reducing the number of optical components required between the signal source and the optical waveguide or fiber carrying the signal. In this manner the present invention provides a more cost effective packaging arrangement for a signal source incorporated into an electro-optical interface.

The reduction in the number of components required in such a coupling arrangement reduces the packaging cost, both because fewer components are required (lower capital cost) and because fewer steps are required (lower labour cost) to package the components together to achieve adequate alignment and coupling efficiencies. Such an improved ease of manufacture has a significant impact on the costs of manufacturing packaged signal sources intended for such electro-optical interfaces.

The present invention further comprehends accomplishing the foregoing while still maintaining signal quality characteristics including avoiding coherence collapse, mode hopping, and the like. In particular, the present invention is directed to a low cost, efficient, and effective solution to overcoming detrimental effects of back reflection to a signal source cavity without the use of a costly isolator. The present invention comprehends providing a stable output from the signal source which is both predictable and of high quality to meet the network demands for quality signal sources, while at the same time providing the reduced cost manufacturing process as noted above. The present invention comprehends using lenses if appropriate or desirable to help couple signal output to a waveguide.

The present invention further comprehends a method of coupling a signal source to a waveguide which meets the objectives of providing a low cost, high quality signal generator coupled to a waveguide.

Therefore, according to one aspect, the present invention provides an electro-optical interface, said interface comprising:

a package base for connection to a source of electronic signals;

an optical signal source mounted on said base and having a cavity, a second or higher order grating associated with the cavity, said optical signal source being operatively connected to said package base whereby said electronic signals are converted into surface emission optical signals when said signal source is energized; and a waveguide operatively positioned adjacent to said optical signal source wherein said surface emissions are coupled to said waveguide, said cavity being sized, shaped and positioned so that the radiation field is not a mode discrimination mechanism and any back reflection received in the cavity affects only the coupling coefficient to the radiation field, without affecting signal quality, wherein said surface emissions of signal source are coupled to the waveguide without an intervening optical isolator. In one aspect the cavity is configured by utilizing a quarter-phase shift grating so that the radiation field is not a mode discrimination mechanism.

In another aspect the present invention provides a method of coupling an optical signal source to a waveguide, the method comprising the steps of:

providing a semiconductor laser having a second or higher order grating and a cavity, said cavity being sized and shaped to produce signals within the telecommunications band, the grating being sized and shaped to produce surface emissions, operatively positioning said semiconductor laser adjacent to a waveguide, and coupling the surface emissions to the waveguide without an intervening optical isolator.

BRIEF DESCRIPTION OF THE DRAWINGS

Reference will now be made to various figures, by way of example only, which depict preferred embodiments of the invention and in which.

DETAILED DESCRIPTION OF THE PREFERRED EMBODIMENTS

Figure 1:
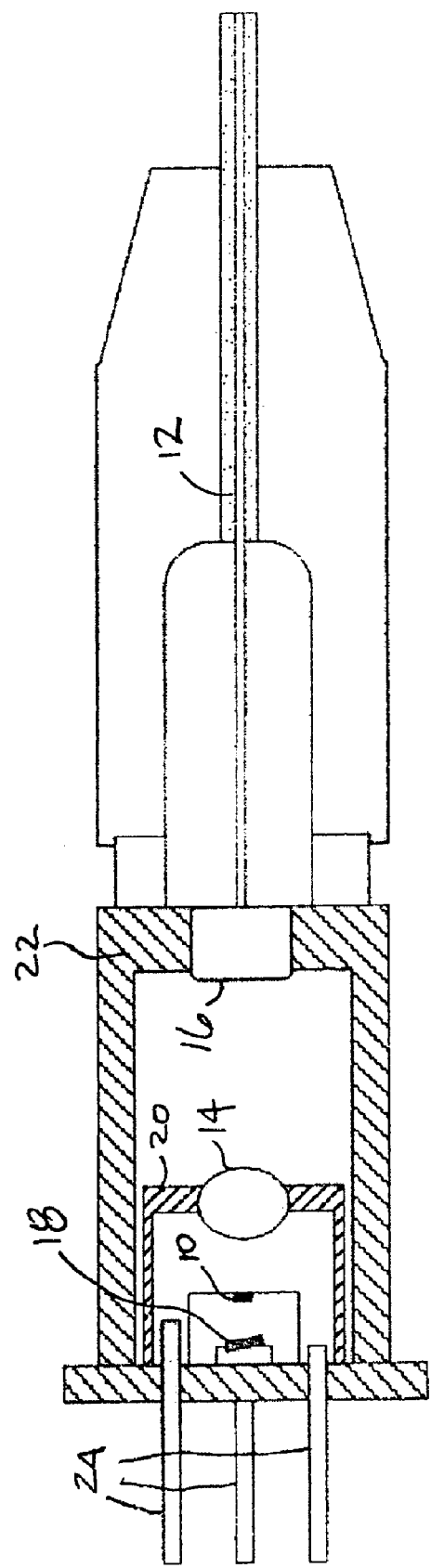
FIG. 1 is a typical prior art connection for a CWDM electro-optical coupling.
Figure 2:
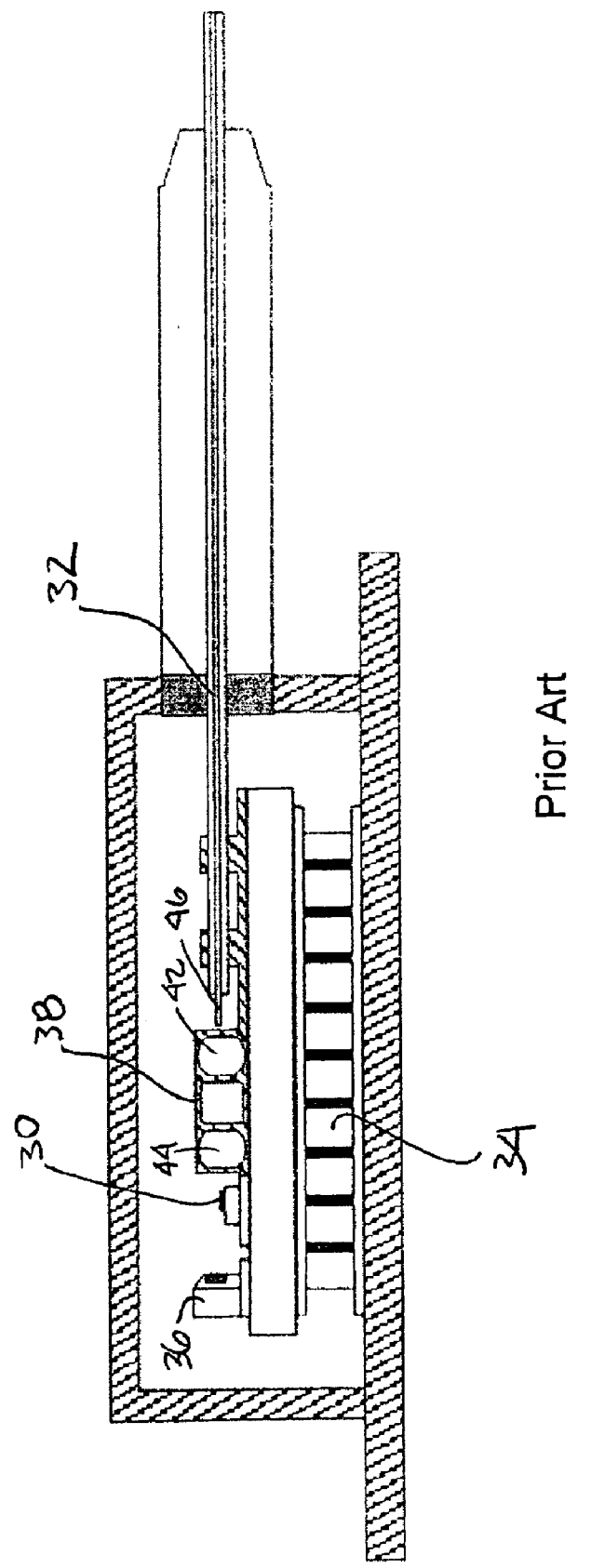
FIG. 2 is a typical prior art connection for a DWDM electro-optical coupling.

In this description the following terms have the following meanings: waveguide coupling axis means the axis along which the signals propagate to couple to a waveguide. This is also referred to in this specification as a vertical axis. The oscillation axis is the axis along which laser oscillations take place within the cavity and is also referred to herein as a horizontal axis. It will be understood however that the terms horizontal and vertical are intended to be relative terms only and that the present invention comprehends that the actual orientation of the device in space does not matter nor will its position affect the performance of the present invention in accordance with the teachings of this specification. Waveguide means any structure used to guide an output carrier signal, such as a fibre or other chip based waveguide structure. The term laser cavity means a structure in which lasing oscillations arise. The term connection space means a space in which a waveguide may be positioned to couple to emissions from the signal emitter. The term operatively connected means connected in a functional way to permit the components so connected to function as desired. The term gain in this description means the value of the optical signal power gain or loss at a particular location.

The preferred signal source according to the present invention is a semiconductor laser, which may readily be formed as a monolithic structure. A typical construction for such a laser provides a semiconductor structure having a substrate, an active layer, cladding layers surrounding the active layer, outer faces and electrodes by which voltage can be applied across the semiconductor structure. Also provided is an opening or window on one surface to permit the signal to be emitted and a second or higher order grating within the laser cavity. The grating is formed from elements of alternating characteristics (gain or index) having a predetermined period. The present invention contemplates the use of grating elements of alternating gain, the so called gain coupled or loss coupled gratings which include gratings of alternating index (the so called complex coupled gratings) as well as purely index coupled gratings. As detailed below, index coupled grating lasers which have radiation fields which are a mode discrimination mechanism are not comprehended by the present invention. Laser structures in which the radiation field is not a mode discrimination mechanism are comprehended, so for example, an index coupled grating with a quarter-phase shift is comprehended by the present invention. Other strategies are also comprehended, such as a careful attention to the duty cycle of a complex coupled grating, but may have other disadvantages, such as requiring high material gains to be sufficiently stable.

The preferred semiconductor laser of the present invention is a high power surface emitting semiconductor laser with a single lobe far field radiation pattern which is suitable to be coupled to a waveguide. Most preferably the high power is achieved with reasonable efficiency and the signal quality is such that it can be used in telecommunications systems. Where a phase shift structure is used it most preferably will also help to render the far field pattern more Gaussian in shape. Other methods as are known in the art for improving the mode pattern are also comprehended by the present invention.

Figure 3:
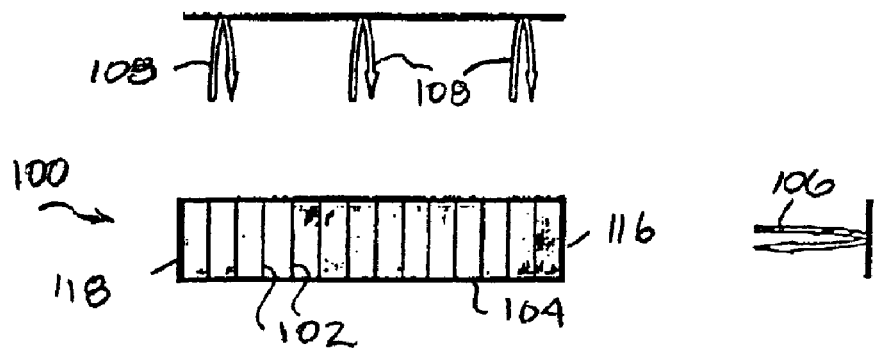
FIG. 3 is side view of a surface-emitting laser signal source with back reflection.

An optical signal source according to the present invention is depicted generally at 100 in FIG. 3. The preferred optical signal source is a semiconductor laser as explained above producing surface emissions generally normal to the surface or outer face of the laser. The optical signal source 100 includes a grating 102 associated with a laser cavity 104. As can be seen the oscillation conditions of the surface emitting DFB laser 100 are obtained by the boundary conditions of the horizontal cavity and there are no oscillations in the vertical direction with signal back reflection shown as 108. The presence of a second or higher order gating promotes the expression of the output signal as a surface emission. With a horizontal cavity as shown, the effect of feedback 106 from the side edges 116, 118 is the same as in the prior art. The effect can be considered by modelling the laser as having an external cavity in addition to the intended cavity and thus feedback in the horizontal direction from the edges 116, 118 will have detrimental effects, as it will tend to disrupt the intended lasing oscillations required for accurate carrier signal production.

Figure 4:
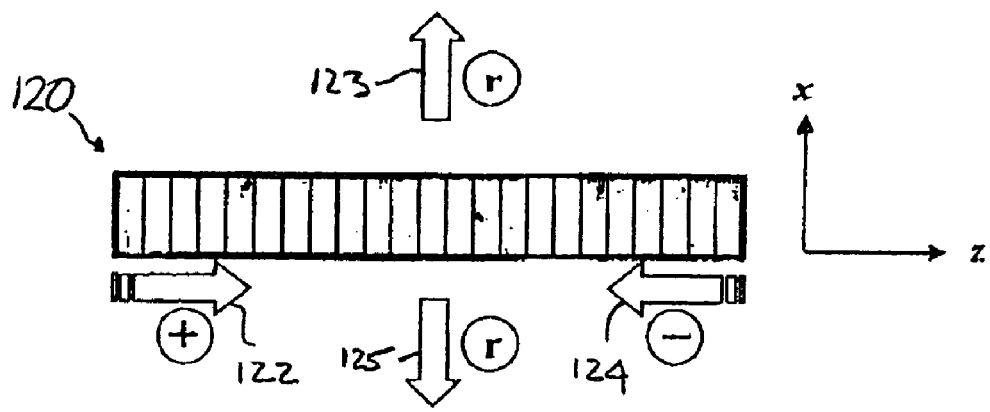
FIG. 4 is a side view of a second order DFB laser signal source according to the present invention.

The present invention comprehends coupling the surface emissions from the laser to a waveguide. Thus, it will be understood that the laser 100 does not have any oscillation in the vertical or waveguide coupling direction. The effect of feedback or back reflections 108 along the waveguide coupling axis back into the cavity will not have the same effect as in the edge emitting case, where the back reflections enter into the cavity along same axis as the oscillation in the laser cavity 104. FIG. 4 shows a second order DFB surface emitting laser 120. As shown this cavity will exhibit two coherent counter-running guided waves 122 and 124 in the +z and −z directions. These waves 122, 124 will be highly confined within the laser cavity by means of the cladding layers in a known manner, and will interact with each other through second order diffraction. Due to the interaction of the counter running guided waves 122 and 124 and the grating, a surface emission radiation field r is generated from top 123 and bottom 125 of the laser 100 as shown.

Figure 5:
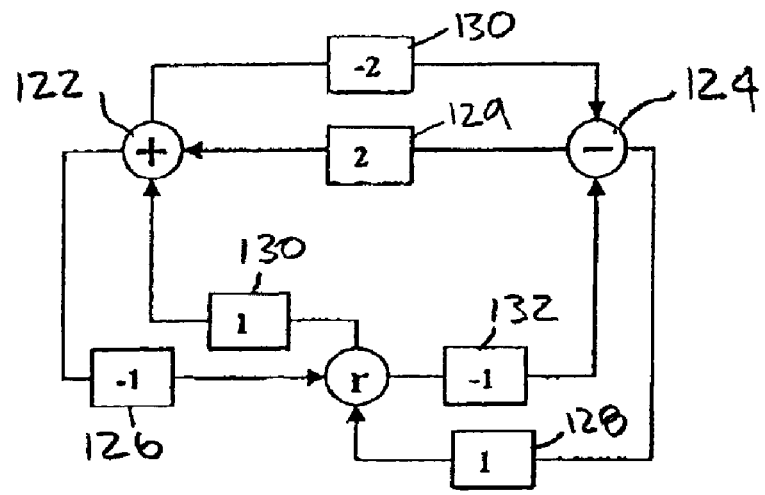
FIG. 5 is a diagrammatic representation of the basic mechanism of interaction of the laser of FIG. 4.

FIG. 5 illustrates the basic interaction mechanism of the second order grating and the oscillations in the laser cavity as previously described. As shown, the positively and negatively travelling guided waves 122, 124 interact with the grating via first order diffraction at 126, 128, which in turn generates a radiation field r. The radiation field r in turn interacts at 130, 132, through first order diffraction with both the positively and negatively travelling guided waves. Finally, through second order diffraction, the positively and negatively travelling guided waves are directly coupled with each other 129, 130. At resonance, all of these interactions are self-consistent and stable.

Figure 6:
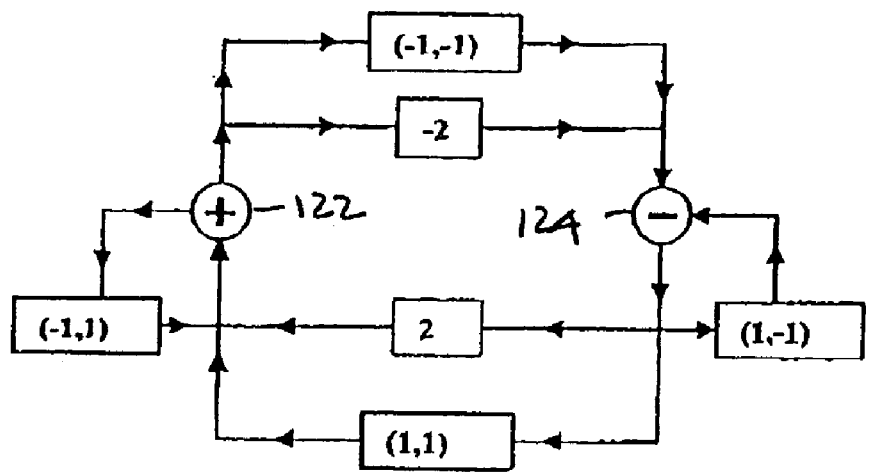
FIG. 6 is a model of a second order resonant grating according to the present invention.

As previously stated, there is no oscillation along the vertical or waveguide-coupling axis of the present invention. The second order grating introduces an additional coupling mechanism between the guided waves through the radiation-coupling coefficients. In FIG. 6, the positive and negative waves 122, 124 are directly coupled through the coupling coefficients shown as 2, and −2. All the indirect coupling of the positive and negative waves are shown through the radiative coupling coefficients labelled (1,1), (−1, −1), (−1, 1) and (1, −1). Note that in these labels the 1 and 2 designation refers to first and second order diffraction respectively and the radiative coupling coeffiecients consist of a pair of first order diffractions since the coupling is achieved by first order from travelling wave to radiative field in conjunction with a first order coupling of the radiative field to a travelling wave. Thus, FIG. 6 models the second order resonant grating with back reflection.

As can now be understood from the foregoing models, the coupling coefficients due to the radiation fields are obtained by applying the boundary conditions in the vertical, waveguide coupling direction and not in the direction of the oscillations within the cavity. Therefore any back reflection into the cavity affects the only the radiation coupling coefficients. This is explained in more detail below.

Figure 7:
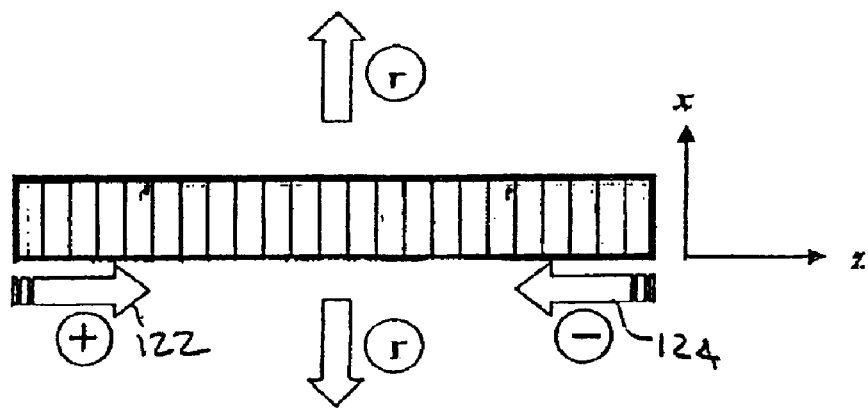
FIG. 7 is a representation of a second order DFB laser signal source with absorbing boundary conditions in the vertical direction.

Second-order DFB lasers with reflectors on both sides of the cavity in the vertical direction can be considered, to determine the effect of back reflections into the cavity on signal output quality. To this end, first it is insightful to consider a 2-D model of a second-order DFB laser with absorbing boundary conditions in the vertical direction as shown in FIG. 7. In this structure a highly confined +z travelling wave 122 defined by the function $A(z)e^{(-j(2\pi/\Lambda)z)}F(x)$ interacts with the grating of period $\Lambda$ via second-order diffraction and generates the coherent −z travelling wave 124 $B(z)e^{(j(2\pi/\Lambda)z)}F(x)$ which is also confined in the x direction. F(x) is the transverse profile of the guided modes in the x direction. By symmetry, the −z travelling wave also interacts with the grating and reacts on the +z travelling wave. This mutual interaction between the guided modes is described by the coupling coefficient k. In addition to the guided waves, a radiation field r is also generated as a result of the interaction of the guided waves with the grating via first-order diffraction. Treating the guided waves as the source of the radiation field, the radiation field can be obtained from guided waves by seeking the Green's function, which satisfies the following equation [1]:

$$\frac{\partial^2 G(x, x')}{\partial x^2} + n^2(x)k_0^2 G(x, x') = \delta(x - x') \quad (1)$$

where n(x) is the refractive index profile of the unperturbed geometry of the waveguide in the absence of the grating or any gain or loss and $k_o$ is the wave number at the lasing wavelength. The boundary conditions along the x direction are the key for obtaining the Green's function. For example, for the structure shown in FIG. 7, the Green's function is the solution of the homogeneous differential equation $$\frac{\partial^2 G(x, x')}{\partial x^2} + n^2(x)k_0^2 G(x, x') = 0 \quad (2)$$

Since there is no boundary condition in the x direction, the solution of (2) has a travelling wave character in the +x and −x directions and only the boundary conditions at x=x' is applied. The radiation field in turn interacts with the grating and reacts on the guided waves. Since the radiation field is originally generated by the guided modes, this reaction can be described by an additional coupling coefficient between these two guided modes which is denoted by $k^r$. In resonant second-order gratings k and $k^r$ are the key parameters describing the longitudinal mode of the DFB laser. More precisely, the longitudinal mode of the DFB laser is governed by the following coupled-differential equations:

$$\frac{dA}{dz} = (a - j\delta + k')A - j(k + jk')B \quad (3)$$

$$\frac{dB}{dz} = j(k + jk')A - (a - j\delta + k')B \quad (4)$$

Figure 8:
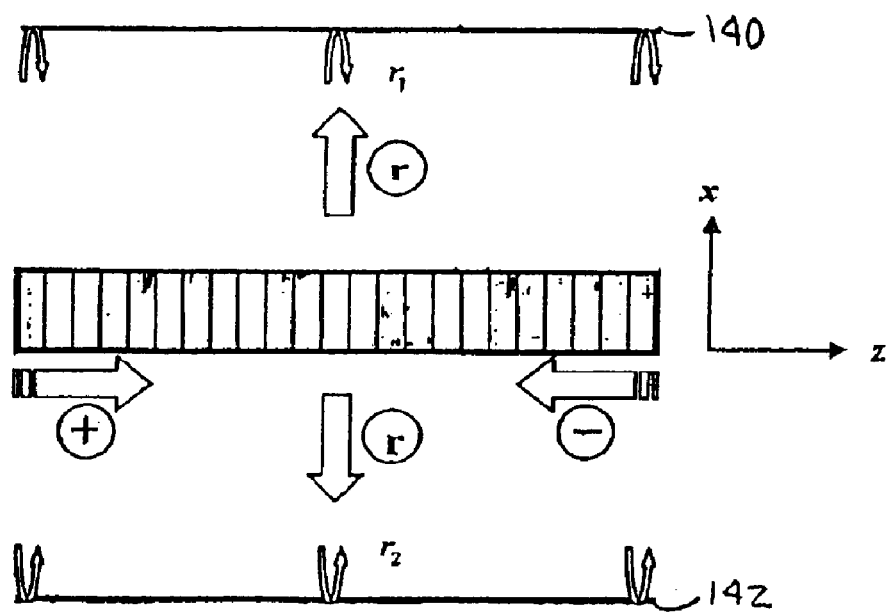
FIG. 8 is the representation of FIG. 7 with reflectors in the vertical direction
Figure 9:
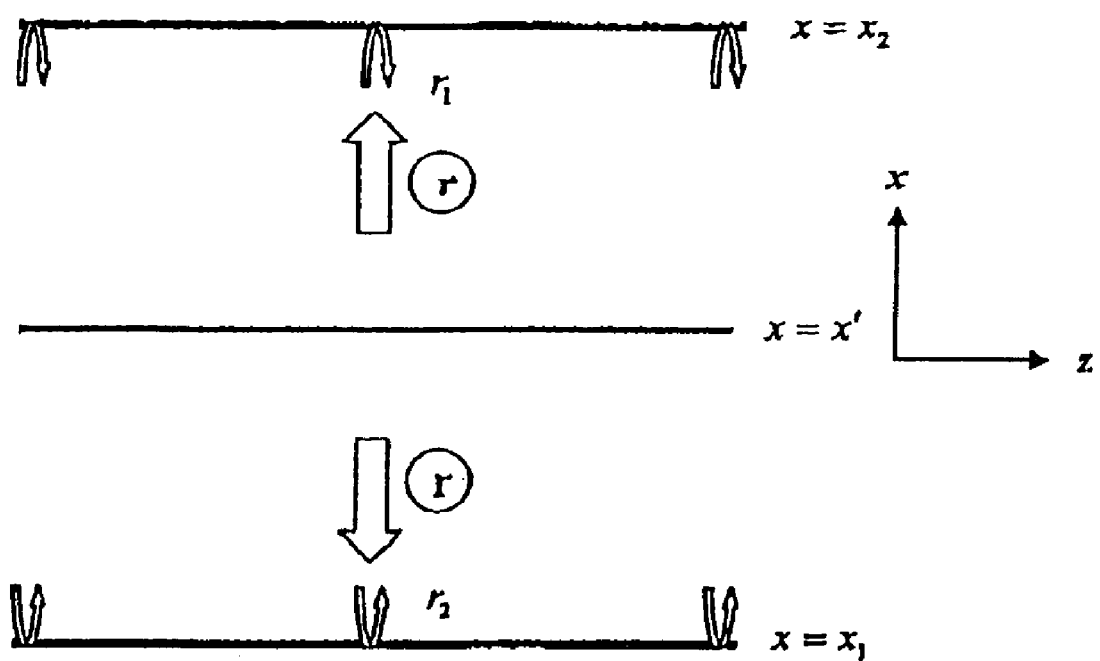
FIG. 9 is a model for obtaining the Green's function of the second order laser signal source of FIG. 8.

In dealing with DFB lasers with second-order grating it should be noted that the presence of a reflector in the vertical direction only affects the coupling coefficient due to the radiation field. More specifically, for a second-order DFB laser illustrated in FIG. 8 with reflectors 140, 142 at both sides in the vertical direction, the Green's function is a solution of homogeneous differential equation (2) with the boundary conditions illustrated in FIG. 9. In fact, unlike the case shown in FIG. 7, the solution in $x_1 < x < x_2$ is of standing wave type and is travelling for $x < x_1$ and $x > x_2$. Needless to say, the new boundary conditions change the coupling coefficient due to the radiation field and hence one of the parameters in the longitudinal model. For a second-order DFB laser with an index grating without any phase shift the coupling coefficient to the radiation field is the key parameter responsible for mode selectivity, making such a structure sensitive to back reflection and requiring an isolator.

Therefore, any reflection may affect the laser mode or the side-mode suppression ratio. For example, if two perfect mirrors are placed at $x = x_1$ and $x = x_2$ all of the radiation field will be fed back into the cavity and there would be no radiation loss responsible for the mode selection. Therefore, the laser behaves as an index-coupled one and mode hopping will happen. Note that this phenomenon happens despite the fact that the coupling to the radiation field is weak. On the other hand, for a phase shifted second-order laser, radiation field is not a mode discrimination mechanism. Even if all of the radiation field is fed back into the cavity the laser behaves as a purely index-coupled one with phase shift and it will lase at the Bragg wavelength without any mode hopping.

As can now be appreciated by the foregoing description, the surprising result is that by controlling the size, shape and configuration of the cavity, a laser signal source which is highly insensitive to back reflection can be provided. The insensitivity arises where the back reflections only affect the coupling coefficient due to the radiation field, rather than any of the fundamental modes of oscillation of the laser. Thus, provided the laser cavity is one in which the radiation field is not a mode discrimination mechanism, the insensitivity will be obtained. In this sense the laser cavity configuration isolates the back reflection from the cavity oscillations making the signal emitter performance substantially insensitive to back reflection without the need for any specific isolator structure interposed on the signal path between the signal source and the associated waveguide.

The present invention comprehends all forms of semiconductor laser which manifest such back reflection insensitivity, including gain and loss coupled grating structures, as well as those incorporating phase shifting or the like. Further, although not determinative of the insensitivity, the present invention does comprehend that the oscillation axis of the highly confined and guided waves in the cavity be different from, and most preferably orthogonal to, the waveguide coupling axis. In this sense insensitivity means that the signal quality (particularly including the wavelength, power and sidemode suppression ratio) is to a high degree not affected by the presence or absence of random back reflections into the cavity. In this sense the term insensitive is relative, and a very high (i.e. more than about 50%) back reflection will in some cases still cause noticeable change in some signal quality parameters but the laser will remain within operating parameters.

As can now be further appreciated, the present invention comprehends an electro-optical interface in which an optical emitter can be directly coupled to a fibre waveguide by operatively positioning the waveguide adjacent to the signal emitter to permit the signals emitted to couple to the waveguide. With an appropriately sized, shaped and configured cavity, the coupling to the waveguide can be accomplished without any intervening isolator and further without any unacceptable loss of signal quality due to back reflection. Thus, the present invention is directed to an isolator-free electro-optical connection. Without the need for an isolator both capital and labour costs are reduced, making the present invention more available to the market.

Figure 10:
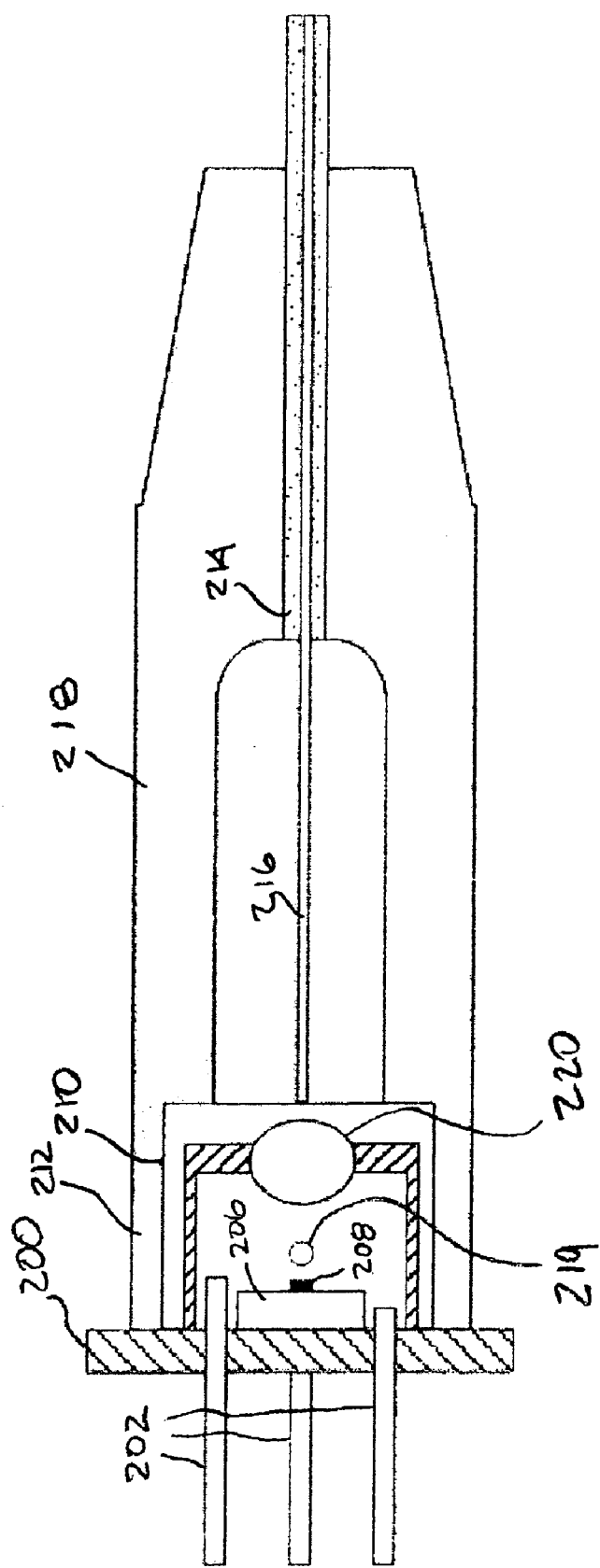
FIG. 10 is an example of an electro-optical connection according to one embodiment of the present invention.

FIG. 10 shows a CWDM electro-optical assembly according to the present invention. There is a co-ax base 200 with electrical connectors 202. Then there is a substrate 206 onto which the laser chip 208 is operatively connected. A connection cavity 210 is formed by boot wall 212. A fibre assembly 214 surrounds a fibre 216 and is sized and shaped to fit into the connection cavity 210. A boot 218 completes the mechanical connection of the fibre assembly to the fibre itself. An optional rod lens 219 and a ball lens 220 are shown and help to couple the signal output to the fibre 216.

As will be appreciated from the foregoing description the present invention provides for much less expensive packaging of the signal source than was possible in the prior art. Quite simply, the need for an isolator 16 has been eliminated, with the surface emissions being fed directly into the fibre in the preferred embodiment. The present invention comprehends the use of a lens 220 or lenses, if desired, to assist in coupling the signal to the fibre, depending upon the form of the signal output, and its suitability to be easily coupled to the fibre. In this way the present invention comprehends a simple plug and play field connection for an electro-optical interface, where the fibre can be more closely positioned to the signal source, and thus signals more easily and reliably coupled thereto as compared to the prior art.

Figure 11:
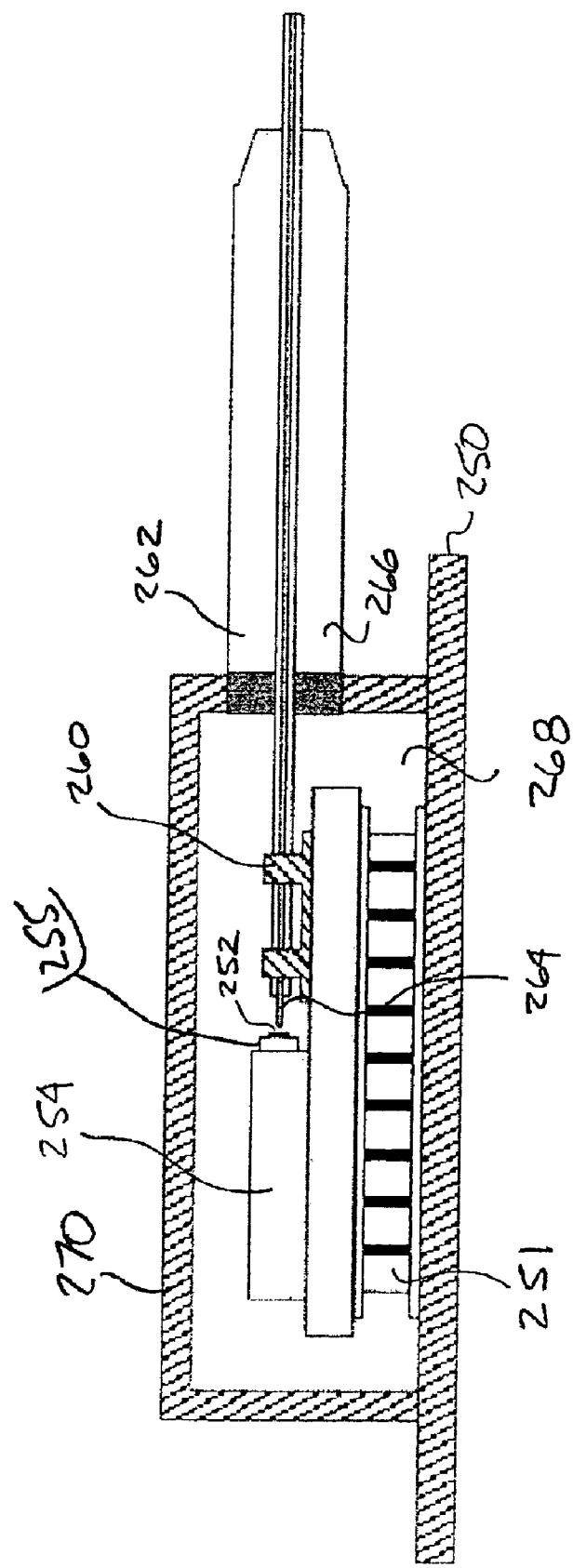
FIG. 11 is an example of an electro-optical connection according to a second embodiment of the present invention.

FIG. 11 shows a DWDM connection according to the present invention. In this embodiment the package base 250 may for example be a 14-pin butterfly style base. The present invention also comprehends other types of package base and the 14 pin butterfly is provided by way of example only. Essentially the base 250 functions to operationally connect the electrical signals to the electro-optical interface in such a way as to permit the electrical signals to be converted into optical signals through the semiconductor laser chip 252.

Connected to the package base 250 is a TEC (thermoelectric cooler) 251 which can absorb and thus dispose of extra heat energy, which might otherwise affect the output signal wavelength or signal quality. A heat sink 254 is mounted to the TEC 251 and a substrate 255 is mounted between a laser chip 252 and the heat sink 254. The chip 252 is shown as a surface emitter of the type previously described. The substrate operatively connects the laser chip with the incoming electrical signals, in a known manner, which will be understood by those skilled in the art. Adjacent to the laser chip 256 is a fibre clip 260 of the type that can hold a fibre in place with a metalised fibre assembly 262. A fibre 264 is shown extending through a boot 266 into a connection cavity 268. A removable lid 270 is provided to close the connection cavity 268.

As with the embodiment of FIG. 10, this embodiment requires no intervening elements between the signal emitter or chip 256 and the end of the fibre 264. All that is required is that the fibre be adjacent to the chip, permitting the surface emissions to be coupled to the fibre. This is referred to as operatively positioning the fibre adjacent to the signal emitter. Again, the present invention comprehends also the use of a lens or lens if desired, which may increase the manufacturing yields with the addition of a nominal cost.

As can now be appreciated, the present invention also comprehends a method of coupling an optical signal source to a waveguide that includes a number of separate steps. The first step is to provide a semiconductor laser source having a second or higher order grating and a cavity, the cavity being sized, shaped and positioned to produce signals within the telecommunications band. The grating, in turn, is such as to induce surface emissions. The grating is also designed such that the radiation field is not a mode-selection mechanism. The next step is to operatively position the semiconductor laser adjacent to a waveguide. Then the last step is to couple the surface emissions of the laser to the waveguide without any intervening isolator.

While the foregoing description has been made with respect to various preferred embodiments it will be understood by those skilled in the art that various modifications and alterations can be made without departing from the broad spirit of the attached claims. While some of these variations have been discussed above, others will also be apparent. For example, what is important is to structure the cavity, by shape, size and configuration in a way that a radiation field for said cavity is not a mode discrimination mechanism, so back reflection into the cavity does not result in "coherence collapse". The cavity may be index coupled, with a phase shift, gain coupled, loss coupled as desired, provided the radiation field is not a mode discrimination mechanism.

We claim:

1. An electro-optical interface, said interface comprising:
a package base connected to a source of electrical signals;
a semiconductor telecommunication optical signal source mounted on said base and having a cavity and a second or higher order grating formed within the cavity, said telecommunication optical signal source being operatively connected to said package base to convert said electrical signals into surface emission optical signals when said signal source is energized; and
a waveguide operatively positioned adjacent to said telecommunication optical signal source to couple said surface emissions to said waveguide,
said cavity being sized, shaped and positioned so that a radiation field for said cavity is not a mode discrimination mechanism such that any back reflection received in the cavity affects a coupling coefficient to the radiation field without affecting fundamental modes of oscillation of said cavity.

2. An electro-optical interface as claimed in claim 1 wherein said telecommunication optical signal source is a gain coupled signal source.

3. An electro-optical interface as claimed in claim 2 wherein said cavity includes said grating in an active layer.

4. An electro-optical interface as claimed in claim 1 wherein said telecommunication optical signal source is a loss coupled optical signal source.

5. An electro-optical interface as claimed in claim 4 wherein said cavity includes said grating in a current blocking layer.

6. An electro-optical interface as claimed in claim 1 wherein said cavity includes an index coupled grating having a phase shift sufficient to isolate back reflection from said cavity oscillations.

7. An electro-optical interface as claimed in claim 1 wherein said cavity is sized and shaped guide two counter waves to oscillate in a direction other than along an axis of coupling to said waveguide.

8. An electro-optical interface as claimed in claim 1 wherein said cavity is sized and shaped to guide two counter running waves to oscillate in a direction generally at right angles to the axis of coupling to the waveguide.

9. An electro-optical interface as claimed in claim 6 wherein said isolation makes the surface emission optical signals insensitive to the back reflection.

10. An electro-optical interface as claimed in claim 9 wherein said insensitivity is achieved without an optical isolator.

11. An electro-optical interface as claimed in claim 1 further including one or more lenses located between said signal source and said waveguide to facilitate optical coupling therebetween.

12. A method of coupling an optical signal source to a waveguide, the method comprising the steps of:

providing a semiconductor laser having a cavity;

said cavity being sized and shaped to produce signals within the telecommunications band;

forming a second or higher order grating within the cavity, thereby inducing surface emissions;

operatively positioning said semiconductor laser adjacent to a waveguide, and coupling the surface emissions to the waveguide without an intervening optical isolator and, controlling size, shape and position of the cavity so that a radiation field for said cavity is not a mode discrimination mechanism, such that receiving back reflection in the cavity affects a coupling coefficient to the radiation field without affecting any fundamental modes of oscillation of said cavity.

13. The method of claim 12 where said coupling step further includes positioning one or more lenses to enhance coupling efficiency.

14. An optical signal source for connecting to a waveguide, the signal source comprising:

a surface emitting semiconductor laser having a cavity including an active layer;

a second or higher order diffraction grating formed within the cavity to produce predetermined surface emissions in the telecommunications band when said laser is enerigerized and said cavity and said diffraction grating being sized, shaped and configured to, in combination, to produce said predetermined surface emissions insensitive of back reflections entering in the cavity, such that the back reflections only affect a coupling coefficient due to a radiation field in the cavity without substantially affecting the fundamental modes of oscillation of said cavity.

15. An electro-optical coupler comprising:

a base, a substrate mounted onto said base;

a semiconductor laser telecommunication signal source mounted onto said substrate, said semiconductor signal source comprising a surface emitting semiconductor laser having a second order grating within a laser cavity oriented perpendicular to said surface emission such that any back reflections only affects a coupling coefficient of a radiation field in the cavity without substantially affecting the fundamental modes of oscillation of said cavity;

a positioner to position a waveguide in a connection space to hold the waveguide in an operative relationship with said semiconductor laser; and a fiber waveguide inserted into said connection space and operatively positioned by said positioner adjacent to said signal source wherein signals from said signal source are coupled to said fiber waveguide in the absence of a back reflection signal isolator.

16. An electro-optical coupler as claimed in 15 further including one or more lenses located between said signal source and said waveguide.

17. An electro-optical coupler as claimed in claim 16 wherein said lenses include a simple rod and a simple ball lens.

18. An electro-optical coupler as claimed in claim 16 wherein said positioner comprises a wall defining a connection space around said laser signal source.

19. An electro-optical coupler as claimed in claim 18 wherein said positioner comprises a clip to retain said fiber in an operative position relative to said laser signal source.

20. An optical signal source for coupling to a waveguide for use in telecommunications networks, the optical signal source comprising:

a second order or higher DFB semiconductor laser having a cavity which produces surface emission telecommunication optical signals of a predetermined quality upon being energized;

the cavity when energized having a radiation field which is not a mode discrimination mechanism for lasing and the cavity of the laser is sufficiently insensitive to optical signals reflected into the cavity in the absence of an optical isolator such that back reflection received in the cavity affects a coupling coefficient to the radiation field without substantially affecting fundamental modes of oscillation of said cavity.

21. An electro-optical interface as claimed in claim 2 further including one or more lenses located between said signal source and said waveguide to facilitate optical coupling therebetween.

22. An electro-optical interface as claimed in claim 4 further including one or more lenses located between said signal source and said waveguide to facilitate optical coupling therebetween.

* * * * *